(12) United States Patent
Burky (10) Patent No.: US 7,010,750 B2
(45) Date of Patent: Mar. 7, 2006

(54) METHOD, PROGRAM PRODUCT, AND PROCESSING SYSTEM FOR PERFORMING OBJECT EDITING THROUGH IMPLICIT OBJECT SELECTION

(75) Inventor: William Elton Burky, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 09/931,298

(22) Filed: Aug. 16, 2001

(65) Prior Publication Data

US 2003/0037304 A1 Feb. 20, 2003

(51) Int. Cl.
*G06F 15/00* (2006.01)

(52) U.S. Cl. ...................................... 715/764; 715/765
(58) Field of Classification Search ................ 345/763, 345/764, 765, 754, 762, 780
See application file for complete search history.

(56) References Cited

U.S. PATENT DOCUMENTS

5,574,840 A  11/1996  Kwatinetz et al.
5,832,528 A  11/1998  Kwatinetz et al.

*Primary Examiner*—Cao Nguyen
(74) *Attorney, Agent, or Firm*—Casimer K. Salys; Russell D. Culbertson; The Culbertson Group, P.C.

(57) ABSTRACT

A data processing system (10) has a processor (11), a display device (15), and a user input arrangement (17) which includes a pointer control device (19) such as a mouse. An edit function input is entered through the user input arrangement (17) and a target to be edited is identified in response to the edit function input. The target comprises some displayed object that is specified by proximity to a system pointer (29) at the time the edit function input is received. The edit function input defines an edit operation to be performed by the data processing system (10) on the identified target. After receiving the edit function input and responding to the input by identifying the target, the method includes determining a state of the target which indicates whether or not the edit operation is currently applied to the target. If the state of the target indicates that the edit operation is not currently applied to the target, the method includes applying the edit operation to the target. In this way, the edit operation is applied to the target without first having to explicitly select the target.

16 Claims, 4 Drawing Sheets

*A kind overflow of kindness: there are no faces truer than those that are so washed. How much better is it to weep at joy than to joy at weeping!* 44

40

[ CTRL-B ] 43

*A Kind overflow of kindness: there are no faces truer than those that are so washed. How much better is it to weep at joy than to joy at weeping!*

*A Kind overflow of kindness: there are no faces truer than those that are so washed. How much better is it to weep at joy than to joy at weeping!* 54

50

[ CTRL-B ] 53

*A Kind overflow of kindness: there are no faces truer than those that are so washed.* *How much better is it to weep at joy than to joy at weeping!*

*A Kind overflow of kindness: there are no faces truer than those that are so washed. How much better is it to weep at joy than to joy at weeping!* 64

60

[ CTRL-B ] 63

*A Kind overflow of kindness: there are no faces truer than those that are so washed. How much better is it to weep at joy than to joy at weeping!*

METHOD, PROGRAM PRODUCT, AND PROCESSING SYSTEM FOR PERFORMING OBJECT EDITING THROUGH IMPLICIT OBJECT SELECTION

TECHNICAL FIELD OF THE INVENTION

This invention relates to data processing systems in which text or other objects may be displayed and edited. More particularly, the invention relates to a method for performing editing operations by implicit selection without having to separately select the text or other object to be edited. The invention also encompasses a program product and a data processing system for performing editing through implicit text or object selection.

BACKGROUND OF THE INVENTION

Word processing programs and other types of programs may be executed on a computer system to allow the user to input text and then edit and manipulate the text into some desired form. Spreadsheet programs, general and specialized database programs, drafting or drawing programs, and other types of programs also give a user the ability to enter text, numbers, or other graphically displayed elements and to perform various edit operations on the entered material. Text, numbers, or other elements that can be displayed on a computer system display and edited through a computer program may be generically referred to as "objects."

Computer programs commonly provide a convenient graphical user interface or GUI to graphically display tool bars containing various function "buttons" which may be selected by a user to initiate various operations, including edit operations. Edit operations may also be selected through drop-down or pop-up menus available through the GUI, or may be selected through predefined keystrokes on a keyboard associated with the computer system executing the program.

In order to perform an edit operation, the user must select the object to be edited and then select the edit operation to be applied or performed. The object selection step may be performed in a number of different fashions using a pointer control device for controlling the position of a pointer or cursor on the computer display or using the keyboard associated with the computer system. For example, an object may be selected using the pointer control device, such as a computer mouse, by clicking and dragging the pointer over the desired object appearing on the computer display. As another example, a function key on the keyboard or a function button on a GUI may be used to put the system in a select mode and then a cursor or pointer may be used to expand or contract a selected area on the computer display so as to encompass the desired object to be edited. Selecting the edit operation to be performed may involve pressing a keyboard key or key sequence. Alternatively, the edit operation may be selected using the pointer control device to position the pointer over a toolbar button or menu item displayed on the GUI, and then making an input through the pointer control device or keyboard to select the displayed button or menu item. This sequence of first selecting an object to be edited and then selecting the edit operation as a separate step may be referred to as "explicit selection."

Applying a bold typeface to displayed text or numerals (a "bolding operation") is an example of an edit operation that is commonly available in word processing and other programs. To perform the bolding operation by explicit selection, the user first selects the text which is to be presented in bold typeface and then selects the bolding operation. For example, where a single word in a sentence is to be bolded, the user may use the pointer control device to position the pointer at a start of the word to be bolded and then simultaneously press a key on the pointer control device and move the pointer over the entire word. Commonly, the program displays the selection by inverting the display to show the selected text as light letters on a dark background. The user may then release the pointer control device key and move the pointer on the GUI to a toolbar button and again click a key on the pointer control device. When the pointer control device key is pressed this last time, the bolding operation is applied to the selected word, leaving the word displayed in the desired bold typeface.

Explicit selection may be cumbersome depending upon a number of factors including the nature of the GUI employed by the program and the nature of the pointer control device through which the cursor or pointer is controlled on the GUI. For example, where a single word is to be edited, the user may be required to position the pointer at the start of the word, click a pointer control device key, and then drag the pointer to the end of the word. In this process, the user may inadvertently start the selection point after the start of the word or end the selection point somewhat before the end of the word. When this occurs, the user must un-select the incorrect selection and then start the selection process over from the beginning.

The granularity of selection may be changed in order to help the user better select the desired objects for editing. For example, U.S. Pat. No. 5,574,840 discloses a method for switching the minimum granularity of selection from a single character on the display to a full word. Placing the selection granularity at the level of a full word eliminates the problem of imprecisely selecting a single word or group of words for editing. However, even when the selection granularity level is increased as disclosed in U.S. Pat. No. 5,574,840, the editing operation must be invoked separately from the text selection step.

SUMMARY OF THE INVENTION

It is an object of the invention to provide a method, program product, and data processing system which overcome the above-described problems related to selecting an object for editing. More particularly, it is an object of the invention to provide a method for performing edit operations which eliminates the need to explicitly select an object for editing. It is also an object of invention to provide a program product and data processing system for performing an edit operation without explicitly selecting the object to be edited.

A data processing system according to the invention has a processor, a display device, and a user input arrangement which includes a pointer control device such as a mouse. The processor executes operational software or program code for performing the method steps of the invention as well as for controlling the display device and receiving inputs from the user input arrangement. The method according to the invention includes receiving an edit function input entered through the user input arrangement to define an edit operation to be performed. The method also includes identifying a target in response to the edit function input. This target is identified by proximity to the pointer at the time of the edit function input and comprises some displayed object, such as a graphic element or group of text characters, to which the defined edit operation is to be applied. Upon receiving the edit function input and identifying the target, the method includes determining a state of the target which indicates whether or not the edit operation is currently applied to the target. If the state of the target indicates that the edit operation is not currently applied to the target, the method includes applying the edit operation to the target. In this way, the edit operation is applied to the target without first having to select the target. That is, the edit operation is performed simply by positioning the pointer in close proximity to the target and invoking the operation. The selection of the target to be edited is implicit in the entry of the edit function input.

The amount of characters or other elements to be included in the target is defined by a predetermined level of granularity. Thus, the target may comprise a single character, a group of related characters, such as a word or number, or a group or string of words or numbers.

In the preferred form of the invention, entering the edit function input multiple times while the pointer is positioned at the same target or target string applies the edit operation to increasingly larger related target strings. That is, if the state of the initial target indicates that the edit operation is currently applied to target, the method includes identifying an additional target or target string. This additional target or target string comprises a string of additional characters or elements which includes the previously identified target or target string. For example, where the initial target is defined at the granularity level of a single word, the additional target string may comprise a sentence which includes the word.

Once the first additional target string is identified, the method includes determining the state of that target string. If the state of the first additional target string indicates that the edit operation is not currently applied to that target string, the method includes applying the edit operation to the first additional target string. This process may be repeated several times to apply the edit operation to a paragraph and then several paragraphs for example. In this example, a single word comprises the target, the sentence in which the word is included comprises a first target string, the paragraph in which the first target string sentence is included comprises a second target string and so forth up to some maximum level of granularity.

The edit function input may be entered through the user input arrangement in any suitable fashion within the scope of the invention. For example, the edit function input may be entered by a certain sequence of keystrokes on a keyboard. Alternatively, the edit function input may be entered through the pointer control device used in connection with a GUI menu or other graphical user interface element.

The program product according to the invention includes input program code which is executed to receive the edit function input and associate the edit function input with the edit operation to be performed. Target identifying program code is executed to identify the target in response to the edit function input, and state checking program code then determines the state of the identified target. Operation performance program code applies the edit operation to the identified target if the state of the target indicates that the edit operation is not currently applied to the target. The preferred form of the invention includes additional program code for identifying additional target strings as necessary. In each case, the state checking program code determines the state of the particular target and the performance program code applies the edit operation to the target if the state of the respective target indicates that the edit operation is not currently applied to that target.

These and other objects, advantages, and features of the invention will be apparent from the following description of the preferred embodiments, considered along with the accompanying drawings.

DESCRIPTION OF THE PREFERRED EMBODIMENTS

Figure 1:
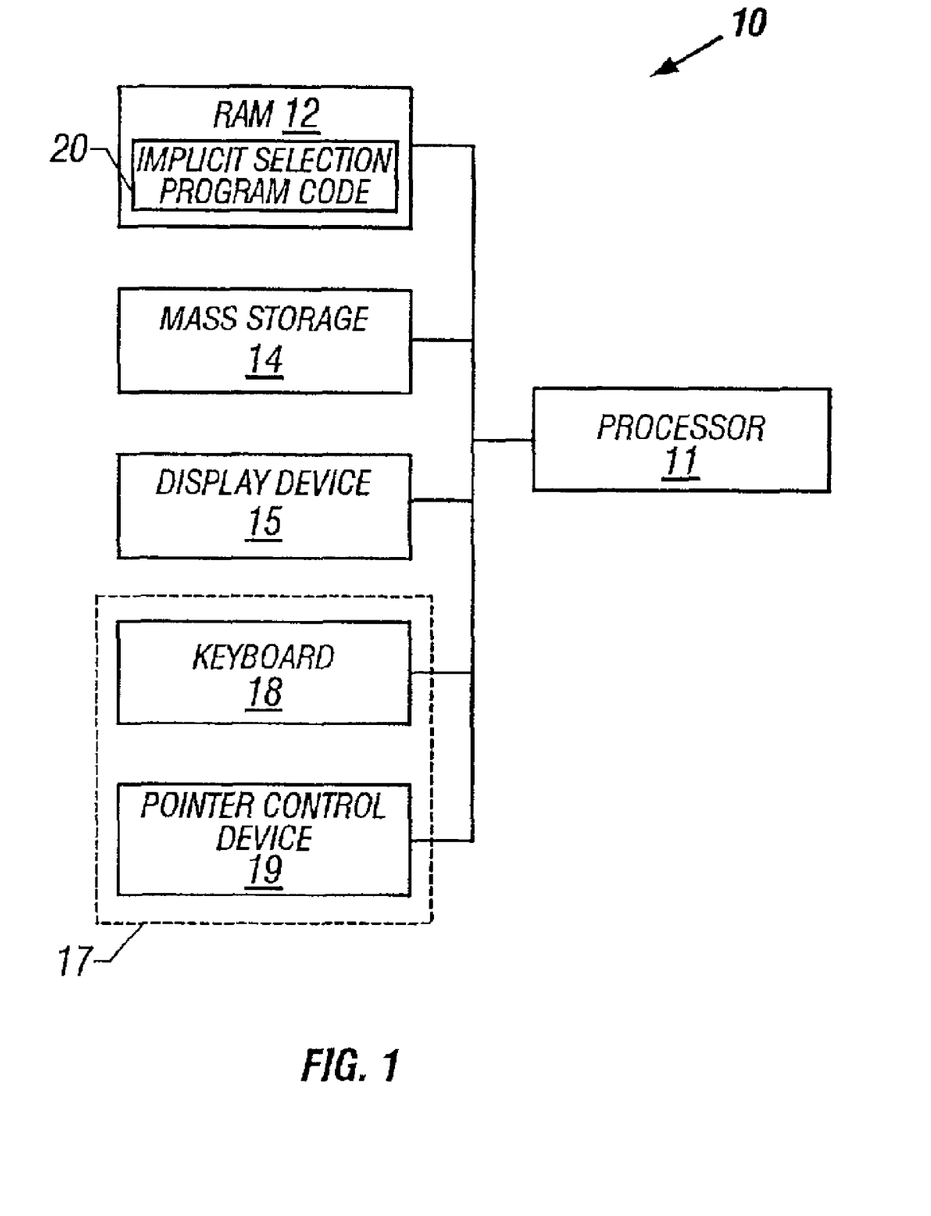
FIG. 1 is a diagrammatic representation of a data processing system embodying the principles of the present invention.
Figure 2:
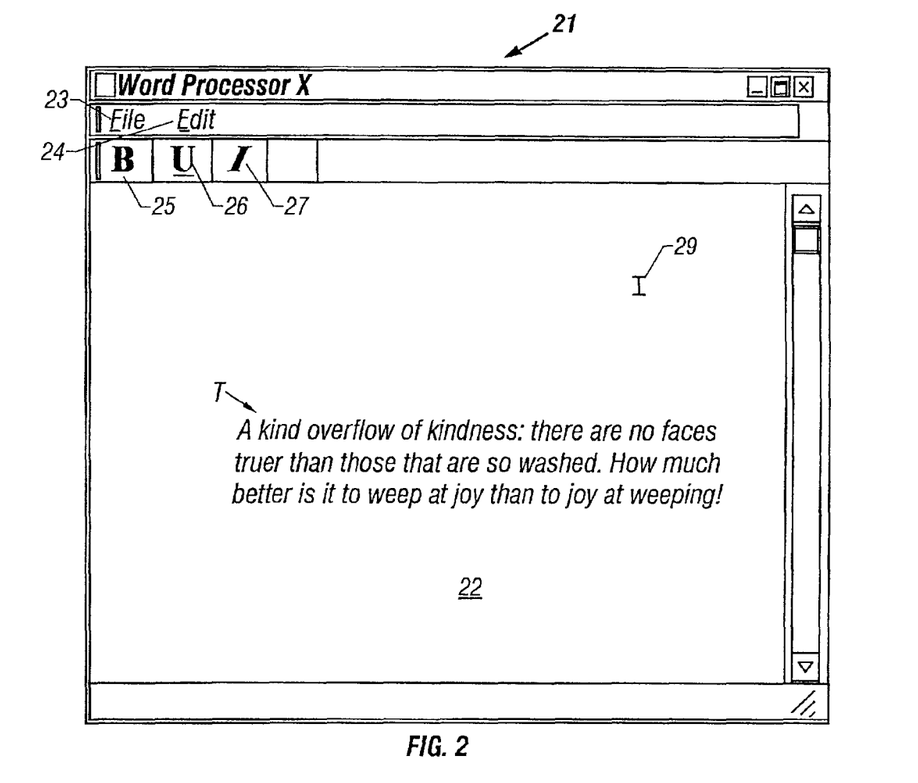
FIG. 2 is a diagrammatic representation of a word processor program display, displaying example text which may be edited according to the invention.

The present invention encompasses both a method for performing an edit operation in a data processing system and a data processing system programmed to perform the edit operation. FIGS. 1 and 2 will be used to describe the data processing system according to the invention, while the editing method will be described with reference to FIG. 3 and to the examples shown in FIGS. 4 through 6.

Referring to FIG. 1, a data processing system 10 embodying the principles of the invention includes a processor or CPU 11 operably connected to random access memory or RAM 12, a mass storage device 14, and a display device 15. Data processing system 10 also includes a user input arrangement shown at dashed box 17. The illustrated user input arrangement 17 includes a keyboard 18 and a pointer control device 19.

Processor 11 executes operational software or program code to perform the method steps which will be described below with reference to FIGS. 3 through 6. Generally, the program code will be loaded in RAM 12. Thus, implicit selection program code 20 according to the invention is shown in FIG. 1 as being associated with RAM 12. Although not shown in FIG. 1, it will also be appreciated that processor 11 will also generally be required to execute operating system software in addition to the implicit selection program code 20. The implicit selection program code may itself be part of the operating system or part of some application program such as a word processing program.

Data processing system 10 shown in FIG. 1 is shown only for purposes of example and is not intended to comprise the exclusive arrangement of elements which may be employed to implement the present invention. The arrangement of elements shown in FIG. 1 represents generally the minimum requirements for a data processing system according to the present invention. Data processing systems embodying the principles of the invention may include many other types of devices and variations on the basic data processing system 10 shown in FIG. 1.

The present invention requires that data processing system 10 include a pointer control device such as device 19 shown in FIG. 1. Pointer control device 19 controls the display location of a pointer element which will be described below with reference to the example display shown in FIG. 2. Numerous different types of devices are available for controlling the location of a pointer on a data processing system display including mouse devices, trackball devices, and joystick devices. In addition to having some arrangement for providing inputs to the system processor to control the location of a pointer on the system display, these devices generally have buttons or other switching devices (not shown) through which the user may enter other inputs to the system processor. Those skilled in the art will appreciate that the system processor will usually be required to execute pointer control device driver software or other program code in order to use the various inputs from pointer control device 19.

Display device 15 in FIG. 1 may comprise a CRT or any other suitable device capable of providing a display such as display 21 shown in FIG. 2. Example display 21 comprises a display which may be generated by a word processor program executed on data processing system 10. The word processor-type display 21 is shown only as a convenient and easily recognizable example for describing the operation and features of the present invention. It will be appreciated that the invention is by no means limited to word processor programs, but may be used with or in any program in which an edit operation may be applied to objects, that is, text, numbers, or other displayed elements.

Word processor-type display 21 includes a document area 22 where text is displayed. Sample text is shown generally at reference letter T. Display 21 also includes a GUI having pull down menu items 23 and 24, along with toolbar buttons 25, 26, and 27. Pull down menu items 23 and 24 are shown as words presented on display 21. In alternative graphical user interfaces, the menu items might be displayed as some other graphical symbols. In any event, selecting one of these items causes a menu (not shown) to appear with a number of options from which a user may choose. Toolbar buttons 25, 26, and 27 comprise graphical representations of buttons which may be selected or "pressed" using the pointer control device to invoke some operation or function available through the word processor program. For example, the three toolbar buttons 25, 26, and 27 may invoke bolding, underlining, and italics, respectively. It will be appreciated that display 21 is greatly simplified by comparison to the displays available through present-day word processor software. For example, a word processor GUI may include eight or nine pull down menu items and twenty or more toolbar buttons. However, the simplified display 21 shown in FIG. 2 is sufficient for describing the operation and features of the present invention.

To access the pull down menus available through menu items 23 and 24 or to invoke a function available through toolbar buttons 25, 26, or 27, the user positions the pointer over the desired menu item or toolbar button and presses a switch associated with the pointer control device 19 in FIG. 1 or a key associated with keyboard 18, for example. The pointer on the example display 21 is shown as an "I-beam" and is referenced by reference numeral 29. Regardless of the manner in which the pointer 29 is displayed on display 21, data processing system 10 uses both the position or coordinates of the pointer on display 21 and the switch input in order to produce the desired result, that is, display the desired menu or invoke the desired function.

As will be discussed further with reference to FIG. 3, the present invention also uses the pointer coordinates and an input. The input in the present invention comprises the edit function input which the user enters through the user interface (17 in FIG. 1). The edit function input may be an input from a single switch or a sequence or combination of inputs entered through several switches or keys included in user interface 17. For example, the edit function input according to the invention may be entered by the combination of keystrokes "CTRL-B" (the CRTL key and B key simultaneously). As an alternative example, the edit function input may be entered by first selecting a GUI menu item or toolbar item and then making a separate input such as a mouse click or keystroke once the pointer is moved to the desired location. The invention encompasses any manner of making the required edit function input, limited only by the requirement that the edit function input must be made while the pointer is positioned over or near the desired text or other object to be edited.

The text T or other objects displayed in display area 22 in FIG. 2 will be defined by a data structure stored in some memory element associated with data processing system 10. Text or other objects, for example a series of lines making up a drawing displayed in a drafting or drawing program, will commonly be defined in a data file stored in RAM 12 in the example system 10 shown in FIG. 1. The data structure will define the various objects which make up the displayed material and include codes or other elements which define the characteristics of the various displayed objects. The program code, which will be described below with reference to FIG. 3, may use these data structure elements to perform various functions or process steps according to the present invention.

The method of editing an object by implicit selection according to the invention may now be described with reference to FIG. 3 and the examples shown in FIGS. 4 through 6. The examples refer to text edits of the type that may be performed through a word processing program. However, it will be appreciated that the word processing edit operations are selected as examples primarily because such operations are widely known and thus provide a convenient environment for describing the invention. In other forms of the invention, an edit operation may be applied to graphic elements such as lines or groups of lines appearing in the display for a drafting program for example, or may be applied to any other type of object which may be displayed on a suitable display.

Figure 3:
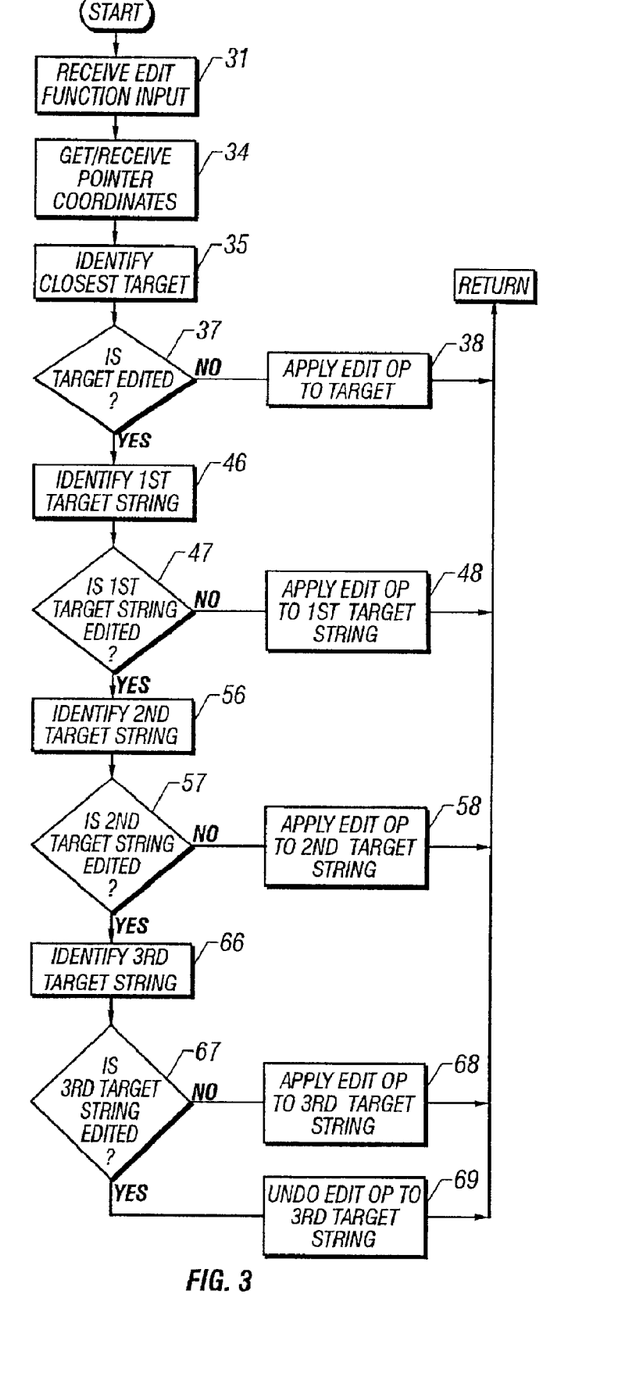
FIG. 3 is a flow chart showing process steps embodying the principles of the present invention.

Referring to FIG. 3, the invention includes receiving the edit function input as shown at process block 31. Regardless of how the edit function input is entered, the input defines the edit operation to be performed. In the preferred form of the invention, input program code executed by the data processing system 10 receives the edit function input. This program code may include a series of prospective inputs, each associated with a different edit operation. Thus, the receipt of a particular edit function input defines the edit operation to be performed by the edit operation associated with the given input. For example, assume that the edit function input is entered by the combination of keystrokes "CRTL-B" as described above and that this combination of keystrokes is associated with the edit operation which changes the appearance of the text to a bold typeface. In this example, the input program code receives the "CRTL-B" input and defines the bolding operation as the edit operation to be performed according to the invention.

The method next includes identifying the target in response to the edit function input. This process of identifying the target is performed by target identifying program code executed by the data processing system and may be broken down into two different steps. The first step includes obtaining or receiving the coordinates of the pointer on the display at the time the edit function input is received as shown at process block 34. As shown at process block 35, the process next includes identifying the target which is closest on the display to the received pointer coordinates. In the preferred form of the invention, the minimum granularity for the target is a single word; thus, the step shown at process block 35 comprises identifying the closest word to the coordinates defined by the pointer location at the time of the edit function input.

Once the target is identified, the method includes step of determining the state of the target. This target state determining step is shown in FIG. 3 at decision block 37 and is performed by state checking program code executed by the data processing system. If the outcome at decision block 37 is negative, that is, if the state of the target indicates that the edit operation is not currently applied to the target, the method of the invention includes applying the edit operation to the target as indicated at process block 38. This step of applying the edit operation is preferably performed by operation performance program code executed by the data processing system.

Figure 4:
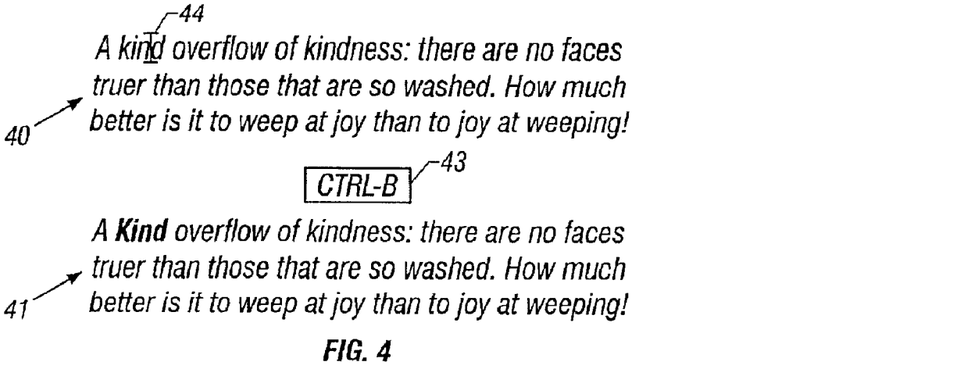
FIG. 4 is a diagrammatic representation of text to be edited along with a representation of the text after applying the edit operation according to the invention.

The actual application of the basic process steps shown at reference numerals 31 through 38 in FIG. 3 may be illustrated with the example shown in FIG. 4. FIG. 4 shows an upper block of text 40 as it may appear before the operation of the present invention, and a lower block of text 41 comprising the text after an edit operation according to the present invention. The edit operation selected for purposes of this example is the operation in which text is changed from a regular to bold typeface. Also, the edit function input is entered in this example by the combination of keystrokes "CTRL-B" as indicated at 43 in FIG. 4, entered through the keyboard associated with the data processing system (such as keyboard 18 in data processing system 10 shown in FIG. 1).

Prior to entering the edit function input, the user has used the pointer control device associated the data processing system to position the pointer, in this case I-beam 44, over the word to be edited. When the user enters the edit function input by pressing "CTRL-B" as indicated at reference numeral 43 in FIG. 4, the input program code executed by the data processing system receives the input as shown at process block 31 in FIG. 3. In response to this edit function input, the target identifying program code obtains the coordinates of pointer 44 on the display at the time of the edit function input as shown at process block 34, and then identifies the target closest to the pointer coordinates as shown at process block 35. In the example shown in FIG. 4, the target comprises the word "kind" over which the I-beam pointer was positioned as shown in upper block of text 40. The state checking program code determines the state of this target word as regular typeface. Since the result of decision block 37 in FIG. 3 is that the edit operation is not currently applied to the target, the operation performance program code applies the edit operation to the target as indicated at process block 38, and then the process returns to start to await the next edit function input. The result of the process is shown by lower text block 41 in FIG. 4, with the target word "kind" appearing in bold typeface.

It will be noted from this example that the edit operation is performed without ever having to explicitly select the text to be edited. The user simply positions the pointer over or near the word to be edited and then enters the edit function input. By making the text selection implicit in the positioning of the pointer, the process eliminates the sometimes cumbersome text selection process and allows the edit operation to be performed more accurately and quickly.

The preferred form of the invention allows the edit operation to be applied to progressively larger blocks of text simply by entering the edit function input multiple times over the same target. To implement this functionality the process shown in FIG. 3 continues with additional steps in the event that the state of the target indicates that the edit operation is currently applied to the target. If the outcome at the decision block 37 is affirmative, the process continues to the additional step of identifying a first target string which includes or encompasses the target as shown at process block 46. The method next includes the step of determining if the edit operation is currently applied to the first target string as shown at decision block 47. This step is preferably performed by the state checking program code similarly to the inquiry described above with reference to decision block 37. If the result of the inquiry at decision block 47 in FIG. 3 is negative, the process includes applying the edit operation to the first target string as shown at process block 48, and then returning to the start of the process flow. The step of applying the edit operation may be performed by the operation performance program code as in the step shown at process block 38.

Figure 5:
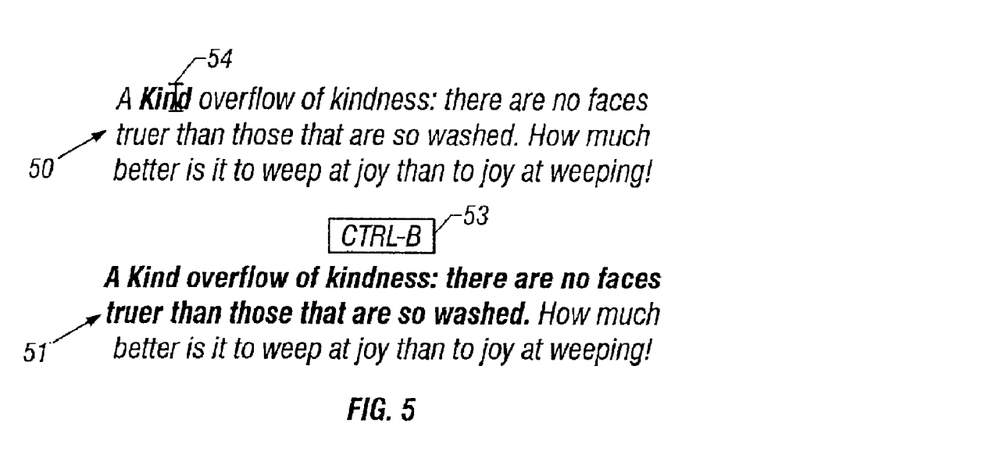
FIG. 5 is a diagrammatic representation similar to FIG. 4 showing how the edit operation is applied to an additional target string of text.

This process of editing a first target string may be described with the example text shown in FIG. 5 and with reference to the process steps shown in FIG. 3. This example again uses the edit operation which changes the displayed typeface from regular to bold. The upper block of text 50 in FIG. 5 shows the state of the text before the editing method is applied. The I-beam pointer 54 in this example is positioned over the word "kind" to which the example edit operation has already been applied, as indicated by the bold typeface in the figure. When the edit function input is entered as indicated at 53 in FIG. 5, the process first goes through process blocks 31, 34, and 35 in FIG. 3 and eventually to decision block 37. At decision block 37, the state of the target of minimum granularity, that is, the word "kind," indicates that the edit operation is currently applied to the target. The process therefore continues to process block 46 in FIG. 3. At this point, the first target string identifying program code identifies the first target string. For purposes of this example, the first target string is defined as the entire first sentence of the example text 50 shown in FIG. 5. The state checking program code then determines the state of the first target string shown at 50, and this state indicates that the edit operation is not currently applied to the first target string since only the word "kind" appears in bold typeface. Thus, the result that decision block 47 in FIG. 3 is negative and the process proceeds to apply the edit operation as shown at process block 48. In our example of FIG. 5, applying the edit operation in this fashion bolds the entire first target string, that is, the first sentence in the example text. This result is shown in the text block shown at 51 in FIG. 5.

Referring back to FIG. 3, the process may continue for additional target strings if the state of the first target string indicates that the edit operation has already been applied to the first target string. That is, if the outcome at decision block 47 is affirmative, the process may continue on to identify a second target string as shown at process block 56. This second target string includes or encompasses the first target string. Once the second target string has been identified at process block 56, the method includes determining if the edit operation is currently applied to this second target string as shown at decision block 57. This determination may be performed by the state checking program code in the program product according to the invention. If the state of the second target string indicates that the edit operation is not currently applied to the entire second target string, the process applies the edit operation to the entire second target string as shown at process block 58, after which the process returns to the start of the process flow. This step of applying the edit operation to the second target string may be performed by the operation performance program code which also applies the edit operation at steps 38 and 48 in FIG. 3.

Figure 6:
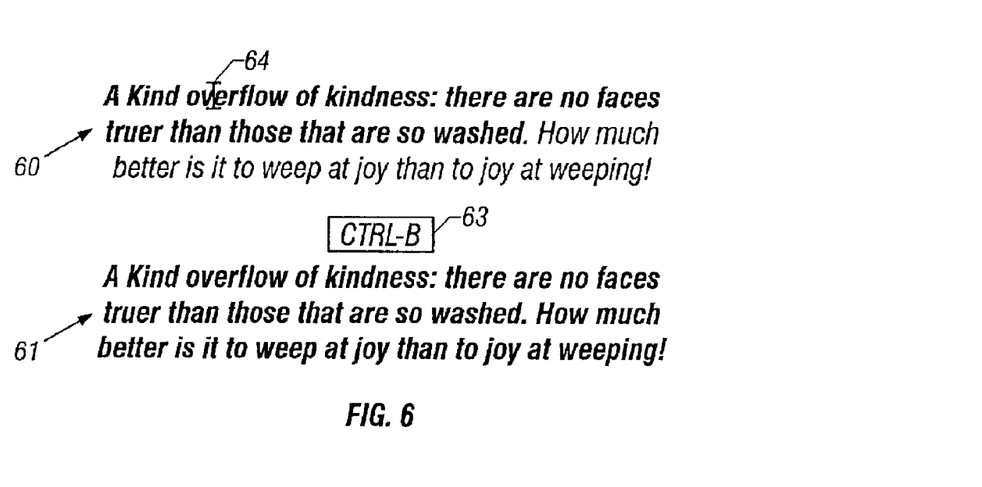
FIG. 6 is a diagrammatic representation similar to FIG. 5 showing how the edit operation is applied to a further target string of text.

The process of applying the edit operation to the second target string may be described referring to the example text illustrated in FIG. 6 and to the flowchart of FIG. 3. The example in FIG. 6 follows the examples of FIGS. 4 and 5, using the same example text and assuming that the same edit operation, changing from regular to bold typeface, is to be applied. The upper text block 60 in FIG. 6 shows the example text at the start of the process according to the invention, with the edit operation having already been applied to the first sentence of text which comprises the first target string.

With the pointer 64 positioned over the word "kind" or any other word in the first target string, the user enters the edit function input as indicated at 63 in FIG. 6. In response to the edit function input resulting from this user entry, the process proceeds through process blocks 31 through 47. The result of each decision block 37 and 47 is affirmative in this example since the entire first target string currently appears in bold typeface, that is, the edit operation is currently applied to that text. Thus, the process shown in FIG. 3 continues to decision block 57 at which point it is determined that the second target string, in this example defined as the entire paragraph of text 60, has not been bolded. A negative outcome at decision block 57 causes the process to flow to process block 58 at which point the edit operation is applied to the entire second target string, that is, the entire paragraph of text. The result of this edit is shown at the example text 61 at the bottom of FIG. 6, with the entire paragraph shown in bold typeface.

As indicated in FIG. 3, this same process may be applied to a third target string. If the result of the inquiry indicated at decision block 57 in FIG. 3 is affirmative, the process may include identifying a third target string as shown at process block 66 and then determining if the edit operation is currently applied to this third target string as shown at decision block 67. If the edit operation is not currently applied to the third target string, the invention may include the step of applying the edit operation to the third target string as shown at process block 68 and then returning to the start of the process flow to await the next edit function input.

If the edit operation is currently applied to the third target string, as indicated by an affirmative outcome at decision block 67, the process may include the step of reversing or undoing the edit operation to the third target string as shown at process block 69. This undo step may undo the edit operation to the entire third string or undo the edit operation to that portion of the third target string over the displayed material defined as the second target string.

Although the undo step at process block 69 is shown only after decision block 67 in FIG. 3 for purposes of example, it will be appreciated that an undo operation may be performed earlier in the process. That is, the invention may comprise performing the undo operation in the event the result at any of decision blocks 37, 47, or 57 is affirmative. Thus, for example, if the result at decision block 37 is affirmative, rather than proceeding to identifying the first target string as shown at process block 46 in FIG. 3, the method may comprise undoing the edit operation to the target. In some forms of the invention, the method may include giving the user the option to proceed to the step of identifying the next larger target string or to undo the edit operation to a current target or target string. This option would require a user input to cause the process to proceed to the desired step, either an undo step or the next target string identifying step.

The state checking program code referenced in the discussion associated with FIG. 3 may use any suitable technique to determine the state of the particular target or target string as having the edit operation previously applied or not. For example, the data structure defining the displayed object to be edited will commonly include codes or other characteristics which identify the object as having a certain appearance. The state checking program code may simply initiate a process which analyzes the data structure defining the particular target or target string to identify any codes or other characteristics in the data structure which indicate the state of the target or target string for purposes of the present invention.

The target identifying program code may also use any suitable technique to identify a target or target string. The particular process employed by the target identifying code will depend upon how the target or target string is defined. Where the target is defined as a single word of text for example, the target identifying program code may cause the data processing device to analyze the text data structure to detect spaces indicating the start and end of the word which is nearest the pointer coordinates received at step 34 in FIG. 3. If a target string or target is defined as a sentence, the target identifying program code may cause the data processing system to analyze the text data structure to locate sentence punctuation elements which identify the start and end of the sentence. If the target string comprises a paragraph, the target identifying program code may implement a process to look for an indent or space in the text data structure which indicates the start and end of a paragraph of text.

The above described preferred embodiments are intended to illustrate the principles of the invention, but not to limit the scope of the invention. Various other embodiments and modifications to these preferred embodiments may be made by those skilled in the art without departing from the scope of the following claims. In particular, it will be appreciated that the word processor examples employed in this disclosure are used simply as an easily recognizable environment in which the invention may be employed. However, the invention is not limited to edit operations for text objects. The invention may be applied to substantially any type of displayed object to which an edit operation of some type may be applied to change the appearance or other characteristics of the object.

What is claimed is:

1. A method of performing an object editing operation in a data processing system having a display for displaying an object and also having a user input arrangement including a pointer control device for providing inputs to control the location of a pointer on the display, the data processing system also having a processing device programmed to receive and respond to inputs entered through the user input arrangement and provide an output for controlling the display, the method including the steps of:

(a) receiving an edit function input entered through the user input arrangement, the edit function input defining an edit operation to be performed by the data processing system;

(b) identifying a target in response to the edit function input, the target comprising an object appearing on the display as specified by proximity to the pointer at the time the edit function input is received;

(c) determining a state of the target; and (d) applying the edit operation to the target if the state of the target indicates that the edit operation is not currently applied to the target;

(e) identifying a first target string for the target if the state of the target indicates that the edit operation is currently applied to the target, the first target string comprising a first string of additional object elements which includes the target;

(f) determining the state of the first target string; and (g) applying the edit operation to the first target string if the state of the first target string indicates that the edit operation is not currently applied to the first target string.

2. The method of claim 1 wherein the object comprises a text object and the predetermined minimum level of granularity defines the amount of text for the target to be a single word.

3. The method of claim 1 wherein the object comprises text and a predetermined minimum level of granularity defines the amount of text for the target to be a single target word, and wherein the first target string comprises a sentence which includes the target word.

4. The method of claim 1 further including the steps of:

(a) identifying a second target string for the target if the state of the first target string indicates that the edit operation is currently applied to the first target string, the second target string comprising a second string of additional object elements which includes the first target string;

(b) determining the state of the second target string; and (c) applying the edit operation to the second target string if the state of the second target string indicates that the edit operation is not currently applied to the second target string.

5. The method of claim 4 wherein the object comprises text and a predetermined minimum level of granularity defines the amount of text for the target to be a single target word, and wherein the first target string comprises a target sentence which includes the target word, and wherein the second target string comprises a paragraph which includes the target sentence.

6. The method of claim 1 wherein the step of receiving the edit function input comprises receiving input data from a keyboard associated with the user input arrangement.

7. The method of claim 1 wherein the step of receiving the edit function input comprises receiving input data from the pointer control device included in the user input arrangement, the input data from the pointer control device including a switch signal from a switch included in the pointer control device.

8. The method of claim 4 further including the steps of:

(a) identifying a third target string for the target if the state of the second target string indicates that the edit operation is currently applied to the second target string, the third target string comprising a third string of additional object elements which includes the second target string;

(b) determining the state of the third target string; and (c) applying the edit operation to the third target string if the state of the third target string indicates that the edit operation is not currently applied to the third target string.

9. A program product for performing an editing operation in a data processing system having a display for displaying an object and also having a user input arrangement including a pointer control device for providing inputs to control the location of a pointer on the display, the data processing system also having a processing device for executing the program product, the program product being stored on a computer readable medium and including:

(a) input program code for receiving an edit function input entered through the user input arrangement and for associating the edit function input with an edit operation to be performed by the data processing system;

(b) target identifying program code for identifying a target in response to the edit function input, the target comprising an object appearing on the display as specified by proximity to the pointer at the time the edit function input is received;

(c) first target string identifying program code for identifying a first target string if a state of the target indicates that the edit operation is currently applied to the target, the first target string comprising a first string of object elements which includes the target;

(d) state checking program code for determining the state of the target and for determining the state of the first target string; and (e) operation performance program code for applying the edit operation to the target if the state of the target indicates that the edit operation is not currently applied to the target and for applying the edit operation to the first target string if the state of the first target string indicates that the edit operation is not currently applied to the first target string.

10. The program product of claim 9 wherein the target identifying program code identifies a single target word of text as the target.

11. The program product of claim 9 further including second target string identifying program code for identifying a second target string if the state of the first target string indicates that the edit operation is currently applied to the first target string, the second target string comprising a second string of object elements which includes the first target string, and wherein:

(a) the slate checking program code determines the stale of the second target string; and (b) the operation performance program code applies the edit operation to the second target string if the state of the second target string indicates that the edit operation is not currently applied to the second target string.

12. The program product of claim 11 further including third target string identifying program code for identifying a third target string if the state of the second target string indicates that the edit operation is currently applied to the second target string, the third target string comprising a third string of object elements which includes the second target string, and wherein:

(a) the state checking program code determines the state of the third target string; and (b) the operation performance program code applies the edit operation to the third target string if the state of the third target string indicates that the edit operation is not currently applied to the third target string.

13. A data processing system including:

(a) a display;

(b) a user input arrangement including a pointer control device, the pointer control device for providing inputs to control the location of a pointer on the display; and (c) a processor programmed to:

(I) receive an edit function input entered through the user input arrangement;

(ii) identify a target in response to the edit function input, the target comprising an object appearing on the display as specified by proximity to the pointer at the time the edit function input is received;

(iii) determine a state of the target; and (iv) apply an edit operation to the target if the state of the target indicates that the edit operation is not currently applied to the target, the edit operation comprising an operation defined by the edit function input;

(v) identify a first target string for the target if the state of the target indicates that the edit operation is currently applied to the target, the first target string comprising a first string of additional object elements which includes the target;

(vi) determine the state of the first target string; and (vii) apply the edit operation to the first target string if the state of the first target string indicates that the edit operation is not currently applied to the first target string.

14. The data processing system of claim 13 wherein the processor is also programmed to:

(a) identify a second target string if the state of the first target string indicates that the edit operation is currently applied to the first target string, the second target string comprising a second string of additional object elements which includes the first target string;

(b) determine the state of the second target string; and (c) apply the edit operation to the second target string if the state of the second target string indicates that the edit operation is not currently applied to the second target string.

15. The data processing system of claim 14 wherein the processor is also programmed to:

(a) identify a third target string for the target if the state of the second target string indicates that the edit operation is currently applied to the second target string, the third target string comprising a third string of additional object elements which includes the second target string;

(b) determine the state of the third target string; and (c) apply the edit operation to the third target string if the state of the third target string indicates that the edit operation is not currently applied to the third target string.

16. The data processing system of claim 14 wherein the target comprises a single target word, the first target string comprises a target sentence including the target word, and the second target string comprises a paragraph including the target sentence.

* * * * *

UNITED STATES PATENT AND TRADEMARK OFFICE
CERTIFICATE OF CORRECTION

PATENT NO. : 7,010,750 B2  Page 1 of 1
DATED : March 7, 2006
INVENTOR(S) : William Elton Burky It is certified that error appears in the above-identified patent and that said Letters Patent is hereby corrected as shown below:

Column 11,
Line 1, delete "and".

Column 12,
Line 40, change "slate" to -- state --.

Column 13,
Line 5, delete "and".

Signed and Sealed this

Sixth Day of June, 2006

JON W. DUDAS
*Director of the United States Patent and Trademark Office*